(12) United States Patent
Mitchell et al.

(10) Patent No.: US 7,797,192 B2
(45) Date of Patent: Sep. 14, 2010

(54) POINT-OF-SALE ELECTRONIC RECEIPT GENERATION

(75) Inventors: Joan L. Mitchell, Longmont, CO (US); Scott D. Mastie, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 10/430,824

(22) Filed: May 6, 2003

(65) Prior Publication Data
US 2004/0225567 A1 Nov. 11, 2004

(51) Int. Cl.
*G06Q 20/00* (2006.01)
(52) U.S. Cl. ............................. 705/16; 705/21; 705/24; 705/30; 235/375; 235/380
(58) Field of Classification Search .................. 705/16, 705/33
See application file for complete search history.

(56) References Cited

U.S. PATENT DOCUMENTS

| | | | |
|---|---|---|---|
| 4,745,267 A | | 5/1988 | Davis et al. |
| 4,897,875 A | | 1/1990 | Pollard et al. |
| 5,191,613 A | | 3/1993 | Graziano et al. |
| RE34,954 E | | 5/1995 | Haber et al. |
| 5,493,613 A | | 2/1996 | Denno et al. |
| 5,649,115 A | * | 7/1997 | Schrader et al. ............... 705/33 |
| 5,701,343 A | | 12/1997 | Takashima et al. |
| 5,739,512 A | * | 4/1998 | Tognazzini .................. 235/380 |
| 5,748,742 A | | 5/1998 | Tisdale et al. |
| 5,809,144 A | | 9/1998 | Sirbu et al. |
| 5,909,492 A | | 6/1999 | Payne et al. |
| 5,915,022 A | * | 6/1999 | Robinson et al. .............. 705/75 |

(Continued)

FOREIGN PATENT DOCUMENTS

CN 1271449 A 10/2000

(Continued)

OTHER PUBLICATIONS

Unknown, "Information Disclosures Statement", IBM Global Services China Ltd, Jul. 4, 2008, 1 page.

(Continued)

*Primary Examiner*—F. Zeender
*Assistant Examiner*—M. Thein
(74) *Attorney, Agent, or Firm*—Kurt Goudy; Hoffman Warnick LLC

(57) ABSTRACT

Systems, methods and program products for automatically generating authenticated electronic receipts at a point-of-sale terminal for both merchants and customers. These electronic receipts can then be used in place of paper receipts for expense accounting, for tax purposes, for routing to accounting and taxation departments, and for real-time analysis of cash-flow and budgeting. The invention prevents loss of paper receipts, always provides a legible receipt, removes employee subjectivity, provides extensive transaction details, removes entry errors, reduces physical storage requirements, promotes continuous expense tracking and eases expense-reporting procedures. In addition, the point-of-sale terminal can integrate the electronic receipt with other available coded data and information about the method of payment such as an image of the check, or the serial number of the paper currency bills used. The other available coded data can make categorization of the data for separation into budget, accounting, or tax categories easier.

11 Claims, 2 Drawing Sheets

U.S. PATENT DOCUMENTS

| | | |
|---|---|---|
| 5,917,913 A | 6/1999 | Wang |
| 6,067,529 A * | 5/2000 | Ray et al. .................. 705/26 |
| 6,078,899 A * | 6/2000 | Francisco et al. ............. 705/19 |
| 6,131,162 A | 10/2000 | Yoshiura et al. |
| 6,185,683 B1 | 2/2001 | Ginter et al. |
| 6,219,788 B1 | 4/2001 | Flavin et al. |
| 6,243,480 B1 | 6/2001 | Zhao et al. |
| 6,260,145 B1 | 7/2001 | Komura et al. |
| 6,279,112 B1 | 8/2001 | O'Toole, Jr. et al. |
| 6,299,062 B1 | 10/2001 | Hwang |
| 6,307,955 B1 | 10/2001 | Zank et al. |
| 6,308,277 B1 | 10/2001 | Vaeth et al. |
| 6,327,656 B2 | 12/2001 | Zabetian |
| 6,330,549 B1 | 12/2001 | Merkle |
| 6,378,075 B1 | 4/2002 | Goldstein et al. |
| 6,516,996 B1 | 2/2003 | Hippelainen |
| 6,648,222 B2 * | 11/2003 | McDonald et al. .......... 235/380 |
| 6,735,630 B1 * | 5/2004 | Gelvin et al. ............... 709/224 |
| 7,051,370 B2 * | 5/2006 | Wakino ...................... 726/30 |
| 2001/0032878 A1 | 10/2001 | Tsiounis et al. |
| 2001/0037313 A1 | 11/2001 | Lofgren et al. |
| 2001/0037454 A1 | 11/2001 | Botti et al. |
| 2002/0004902 A1 | 1/2002 | Toh et al. |
| 2002/0010640 A1 | 1/2002 | Dutta et al. |
| 2003/0055733 A1 | 3/2003 | Marshall et al. |
| 2003/0217005 A1 * | 11/2003 | Drummond et al. .......... 705/43 |

FOREIGN PATENT DOCUMENTS

| | | |
|---|---|---|
| EP | 1030505 A2 | 8/2000 |
| EP | 1 199 664 A2 * | 2/2002 |
| EP | 1 195 706 A2 * | 4/2002 |
| JP | 11053650 A | 2/1999 |
| JP | 11252069 A | 9/1999 |
| JP | 2000312204 A | 11/2000 |
| JP | 2001134645 A | 5/2001 |
| JP | 2002007687 A | 1/2002 |
| JP | 2002297890 A | 10/2002 |
| JP | 2003006551 A | 1/2003 |
| KR | 1020010085205 A | 9/2001 |
| KR | 1020020058325 A | 7/2002 |
| KR | 1020020082670 A | 10/2002 |
| TW | 486646 B | 5/2002 |
| WO | WO0045549 A1 | 7/2000 |
| WO | WO0111843 A1 | 2/2001 |
| WO | 0250789 A1 | 6/2002 |

OTHER PUBLICATIONS

Canadian Patent Application Serial No. 2524062, Office Action dated Jun. 11, 2009.

JP Information Materials for IDS, dated Jan. 8, 2010, Prepared by Shinya Mayama, JPO Office Action dated Dec. 28, 2009.

JP Information Materials for IDS, dated Oct. 7, 2009, Prepared by Shinya Mayama, JPO Office Action dated Sep. 1, 2009.

* cited by examiner

POINT-OF-SALE ELECTRONIC RECEIPT GENERATION

BACKGROUND OF THE INVENTION

1. Technical Field

The present invention relates generally to transaction receipts, and more particularly, to generation of an electronic receipt at a point-of-sale.

2. Related Art

Business management requires careful tracking of expenses incurred by employees on behalf of the business. Expenses made by employees can take a variety of forms such as travel and meal expenses. Conventional expense tracking includes an employer requiring employees to report expenses, and an accounting and taxation department of the employer to collect expense reports submitted by employees including the paper receipts. The accounting and taxation department then organizes and reviews the expense reports including paper receipts and determines where money is being spent for tracking and tax purposes. In some cases, the employer provides an electronic expense reporting system into which employees can enter expense report data.

The above approach to expense reporting suffers from a number of drawbacks relating to use of paper receipts. First, the approach requires an employee to retain paper receipts for submission as part of the expense report. Since receipts are usually small pieces of paper, it is not an infrequent occurrence that they become lost or are destroyed. Once paper receipts are no longer available, the benefit of tracking expenses is lost. Second, in some cases, an employer provides an electronic reporting system that requires an employee to enter expense data from paper receipts. Entry into an electronic reporting system, while easing expense-reporting burdens in some ways, creates a number of problems. One problem is that even the most conscientious user is apt to make entry errors. For example, one of the benefits of an electronic reporting system is that it allows entry of expense categorizations. Unfortunately, entry of these categorizations is prone to keying errors just like any other data entry, and more importantly, is subject to the employee's subjectivity. Since most employees are unaware of the details and meaning of the myriad of expense categorizations that an accounting and taxation department provides, mis-categorization occurs frequently. Where an electronic reporting system is not provided, the accounting and taxation department must evaluate paper receipts, which tends to promote discontinuous expense tracking and end-of-tax-year rushes to collect data. Third, in many cases, an employee must provide line-item details for accurate expense reporting purposes because of paper receipts' limitations, e.g., because of size, to communicate all transaction details. In this regard, any expense reporting system, electronic or otherwise, is prone to cheating because of the reliance on employees to honestly expound on the transaction details that the paper receipts purport to record. Fourth, paper receipts, like all paper-based document systems, require large amounts of storage space, which adds further expenses to a business.

In order to minimize the above shortcomings of paper receipts, many businesses allow employees to use credit cards to pay for business expenses. In many cases, credit card charge data may be provided in electronic form to a credit card holder in the form of date, merchant, total bill and, perhaps, an expense category. This information may then be linked to a particular expense account for tracking. While this information is helpful, credit card systems are generally incapable of collecting, storing and providing the extensive transaction details often required for proper expense reporting, e.g., line-item(s) purchased, number of items purchased, purchaser identification, item(s) description, etc. Internet merchants have been known to provide more extensive transaction data in electronic form such as date, merchant and item(s) purchased. Not all purchases, however, can be made using a credit card or over the Internet. For example, some purchases must be made at point-of-sale terminals with cash or check where the paper receipt is the only transaction record available. Surprisingly, in many cases, merchants may want to collect the extensive expense reporting data regarding a transaction for biometric evaluation, but are unwilling to burden customers with all the requisite queries.

In view of the foregoing, there is a need in the art for generation of an electronic receipt at a point-of sale that solves the problems of the related art.

SUMMARY OF THE INVENTION

This invention includes systems, methods and program products for automatically generating authenticated electronic receipts at a point-of-sale for both merchants and customers. These electronic receipts can then be used in place of paper receipts for expense accounting, for tax purposes, for routing to accounting and taxation departments, and for real-time analysis of cash-flow and budgeting. The invention prevents loss of paper receipts, always provides a legible receipt, removes employee subjectivity, provides extensive transaction details, removes entry errors, reduces physical storage requirements, promotes continuous expense tracking and eases expense-reporting procedures. In addition, the point-of-sale terminal can integrate the electronic receipt with other available coded data and information about the method of payment such as an image of the check, or paper currency bills used. The other available coded data can make categorization of the data for separation into budget, accounting, or tax categories easier.

A first aspect of the invention is directed to a method of providing a receipt to a customer at a point-of-sale, the method comprising the steps of: receiving a receipt instruction including a receipt destination instruction; generating an electronic receipt; and transmitting the electronic receipt to the receipt destination.

A second aspect of the invention is directed to a point-of-sale terminal comprising means for transacting a sale; and means for generating an electronic receipt adapted for transfer to a receipt destination.

A third aspect of the invention is directed to an electronic receipt comprising: a primary key including a unique transaction identifier.

A fourth aspect of the invention is directed to a database comprising: data including a receipt destination identifier and a corresponding electronic receipt destination for receiving an electronic receipt for a purchase made by a customer.

A fifth aspect of the invention is directed to a computer program product comprising a computer useable medium having computer readable program code embodied therein for a point-of-sale terminal, the program product comprising: program code configured to transact a sale; and program code configured to generate an electronic receipt.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the following description includes the following headers: I. Overview—Electronic Receipt; II. Point-of-Sale Terminal Generation of Electronic Receipt; III. Receipt Destination; IV. Operation; and V. Conclusion.

I. Overview—Electronic Receipt

This invention discloses automatically generating authenticated digital receipts in point-of-sale terminals for both merchants and customers. These receipts can then be used in place of paper receipts for expense accounting, for IRS/state proof of expenditure, for routing to bookkeepers/accountants, and for real-time analysis of cash-flow and budgeting. The point-of-sale terminal can integrate the digital receipt with other available coded data and information about the method of payment such as an image of the check, credit card face, paper currency used for payment (or serial number of the bills) or a combination thereof. The other available coded data can make categorization of the data for separation into budget, accounting, or tax categories much easier.

Figure 1:
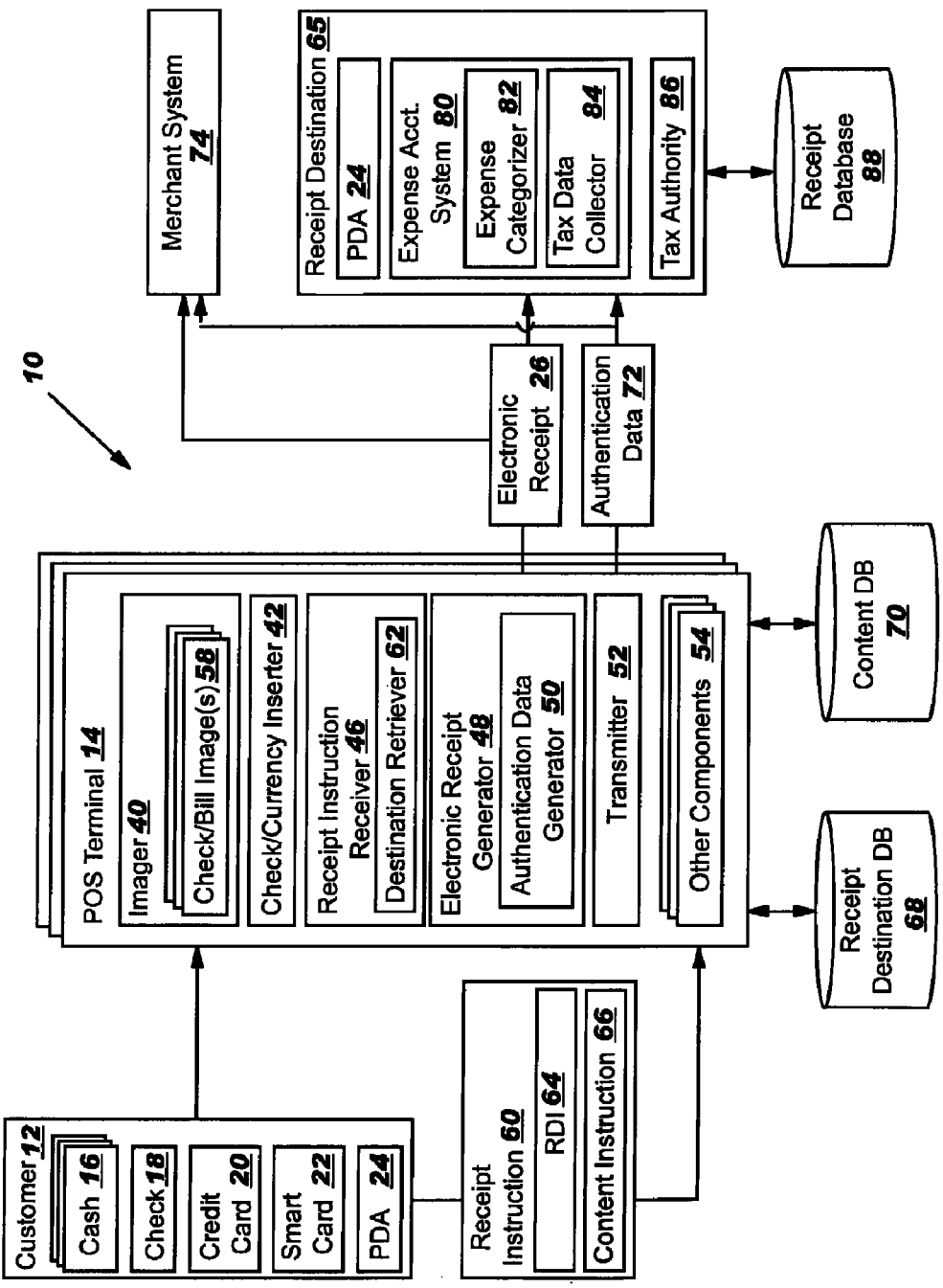
FIG. 1 shows a point-of-sale terminal electronic receipt generation environment.

With reference to the accompanying drawings, FIG. 1 is a block diagram of a point-of-sale terminal electronic receipt generation environment 10 in accordance with the invention. In this environment, a customer 12 approaches a point-of-sale terminal 14 (hereinafter "POS terminal 14") to pay for some product(s) and/or service(s) at POS terminal 14. Customer 12 may pay using any now known or later developed methods. For example, customer 12 may use cash 16, a check 18, a credit card 20 and/or a smart card 22. Customer 12 may also use other well known payment mechanisms such as a gift certificate, store credit, etc. Customer 12 may also include a personal digital assistant 24 (hereinafter "PDA 24") for communicating with POS terminal 14 and/or another payment method. As known in the art, PDA 24 may be any handheld computer system, and may include a communication mechanism (not shown) such as an infrared projector/receiver.

A general overview of environment 10 will now be described—the details of operation will be described below. At the outset, customer 12 approaches POS terminal 14 and may be waited upon by a POS terminal operator (not shown) who takes the customer's payment. Alternatively, in some instances, customer 12 may be allowed to operate POS terminal 14. In any event, customer 12 pays for the product(s) and/or services by presenting suitable payment. POS terminal 14 includes any now known or later developed components for conducting the sales transaction. For instance, POS terminal 14 may include: keyboard, central processing unit (CPU), monitor, bar code scanner, telecommunications system, credit card authentication system, smart card authentication system, PDA communications system, cash drawer, etc. Once POS terminal 14 concludes the sales transaction, an electronic receipt 26 is generated in accordance with the invention. A conventional paper receipt (not shown) may also be generated in a known fashion.

Electronic, or digital, receipt 26 may include any minimal amount of available data that constitutes a primary key (i.e., unique value) in a database to identify a corresponding transaction. In one embodiment, data that may constitute a primary key may include a unique transaction identification. A unique transaction identification may include, for example, a combination of merchant identifier and at least one of a purchase date and a purchase time. However, any combination of available data that creates a unique value (primary key) sufficient to differentiate transactions may be used. Electronic receipts 26 can also be augmented via additional information, such as the merchant id, transaction amount, date, or any other available data, to create other forms of primary keys, or to provide information beyond that which is needed to constitute a primary key. To illustrate, a more robust electronic receipt 26 may include the following fields:

| | |
|---|---|
| :begin receipt. | /* Required field */ |
| :purchase date. | /* Required field */ |
| :time. | /* Optional Field. If provided, should be of the form HH:MM:SS, using a 24-hour clock */ |
| :merchant ID. | /* Required field */ |
| :issuedby. | /* Optional: Issuing agent, if different from merchant. */ |
| :addr. | /* Optional: Repeating line; one ":addr." tag for each line of the address. */ |
| :phone. | /* Optional: Phone number of the merchant. */ |
| :web. | /* Optional: URL of the merchant. */ |
| :fax. | /* Optional: Fax number of the merchant. */ |
| :source. | /* POS terminal number, clerk ID, or other unique identifier for the transaction. */ |
| :transid. | /* Optional: Transaction ID, if available, for this unique transaction. */ |
| :document. | /* Optional: Document number, or other unique identifier for the transaction, e.g., plane ticket. */ |
| :buyer. | /* Optional: Repeating line; one "customer" line for each line of character data about the customer. */ |
| :merchant add. | /* Optional: Repeating line; one ":merchant add." line for each additional merchant line. */ |
| :payment type. | /* Required. Integer value, with one of the following values: */<br>/* 00 = Cash */<br>/* 01 = Check */<br>/* 02 = Charge */<br>/* 03 = Gift Certificate */<br>/* 04 = Refund or Exchange */<br>/* 05 = N/C */<br>/* 06 = Other */<br>/* 07-99 Reserved for additional payment types */ |
| :trans type. | /* Optional. Character field, indicating the transaction type (in person, phone, fax, e-mail, web, etc. */ |
| :chargecard. | /* Optional. Character value of chargecard type, e.g.: "VISA: xxxx xxxx xxxx 3816" */ |
| :purchase total. | /* Required. Total cost of the transaction. */ |
| :total tax. | /* Required. Subtotal of the tax associated with the transaction. */ |
| :total tip. | /* Optional: Total Tip, if any. */ |
| :num items. | /* Required. Positive Integer. Number of items in the transaction. */ |
| :item value. | /* Required. The number of ':item' tags must match the ':num items' tag value. */ |
| :item description. | /* Required. The number of ':item description' tags must match the ':num items' tag value. */ |
| :item date. | /* Optional: The number of individual items, if applicable, e.g., the date of the charge, on a hotel. */ |
| :item type. | /* Optional: Character field, indicating charge, credit, etc. Assumed to be charge if not specified. */ |
| :image | /* Optional: Image of paper currency or check used for payment */ |
| :end receipt. | |

Many retailers such as grocery stores have store cards presented by customers at purchase time to obtain discounts.

The relevant information could be collected at the time of applying for the store card or entered later, for example, via a web-based system or other entry system, for the account on the store card.

II. Point-of-Sale Terminal Generation of Electronic Receipt

With continuing reference to FIG. 1, the details of POS terminal 14 will now be described. POS terminal 14 includes: an imager 40, a check/currency inserter 42, a receipt instruction receiver 44 including a receipt destination retriever 46, an electronic receipt generator 48 including an authenticating data generator 50, a transmitter 52 and other components 54. It should be recognized that while one POS terminal 14 has been illustrated, that a number of terminals 14 may exist within environment 10. For example, in a large retailer, a number of POS terminals 14 exist.

Imager 40 is configured to receive cash 16 in the form of paper currency or bills, and/or checks 18 for scanning into images. Cash 16 may be authenticated in accordance with copending U.S. Ser. No. 10/430,025, which issued as U.S. Pat. No. 6,883,706, incorporated herein by reference. As also disclosed in the copending application, check or bill images 58 may be inserted by check/currency inserter 42 into paper receipt 28 or electronic receipt 26, for recordation purposes.

Receipt instruction receiver 46 is configured to receive a receipt instruction 60 from customer 12, and may include a destination retriever 62 (hereinafter "retriever 62"), described in further detail below. A "receipt instruction" 60 includes a receipt destination identifier 64 and a content identifier 66. In terms of communication form, receipt instruction 60 is received by receipt instruction receiver 46 in a physical form or an electronic form. In terms of the former, receipt instruction 60 may be verbally stated by customer 12 and entered to POS terminal 14 by an operator. In terms of electronic form, receipt instruction 60 may be gathered from a credit card 20 (i.e., when the credit card number is used to retrieve other data), gathered from a smart card 22, transmitted by a customer PDA 24 or some other mechanism of electronic communication.

Receipt destination identifier 64 (hereinafter "RDI 64") is any form of data that expressly indicates, or may be used to determine, where an electronic receipt 26 generated for a transaction for a particular customer 12 is to be sent, i.e., a receipt destination 65. If RDI 64 expressly states receipt destination 65, RDI 64 may take the form of, for example, an Internet protocal (IP) address, a mailing address to receive a saved form (i.e., a CD or diskette) of electronic receipt 26, or any other address capable of being used by POS terminal 14, or its associated merchant, for forwarding electronic receipt 26. If receipt destination 65 is not expressly stated, RDI 64 may include, for example: a customer identification such as the customer's name; a credit card number; a smart card identification; a PDA identifying transmission (e.g., infrared beam); the customer's employer's name or identification; a merchant's customer identification; etc. In this case, retriever 62 functions to access a receipt destination database 68 that includes data including RDI 64 and a corresponding receipt destination 65. For example, for each customer identification (e.g., IBM 123456) used as an RDI 64, a corresponding receipt destination is stored (e.g., IP address 9.99.10.192).

Electronic receipt generator 48 (hereinafter "generator 48") is configured to gather any data desired by a customer 12 per content instruction 66 to be provided in electronic receipt 26, and generate electronic receipt 26. For example, based on the illustrative electronic receipt above, generator 48 would gather: the transaction date and time; merchant name; issuing agent, if different from merchant; merchant address; and the other parameters listed above. If an agreed upon electronic receipt format (e.g., a standard such as used in electronic data formats (EDF)) is in use, generator 48 may function to build an electronic receipt 26 in the same fashion for all customers. Alternatively, personalized electronic receipts 26 based on content instruction 66 may also be possible. In this case, content instruction 66 may be used, for instance, to recall a preferred electronic receipt format from a content database 70 that includes such data. Each electronic receipt format may be generated using, for example, the extensible markup language (XML) or a similar language for providing user defined fields.

Authentication data generator 50 may also be implemented to provide transaction authentication data 72. "Transaction authentication data" 72 is any data that can be used to confirm electronic receipt 26 has not been altered, and may include, for example, receipt contents, date, time, merchant identification, or other data capable of being used to prove the authenticity of electronic receipt 26. Authentication data 72 may be stored at a merchant system 74 for access by receipt destination 65 or transmitted separately to receipt destination 65.

Transmitter 52 is provided to communicate electronic receipt 26 to receipt destination 65. As indicated, electronic receipt 26 may also be communicated to receipt destination 65 and/or merchant system 74. In addition, transmitter 52 may also communicate authentication data 72 to receipt destination 65. Further, as noted above, authentication data 72 may be stored at merchant system 74 for access by receipt destination 65. Transmitter 52 may include any now known or later developed mechanism for communicating electronic data such as a modem, digital signal line (DSL), or other well-known telecommunications system, infrared beam communicator, a local area network, wide area network, etc.

Other components 54 provide any other mechanisms necessary for operation of POS terminal 14 such as mechanisms for transacting a sale, e.g., keyboard, central processing unit (CPU), monitor, bar code scanner, telecommunications system, credit card authentication system, smart card authentication system, PDA communications system, cash drawer, etc.

III. Receipt Destination

With continuing reference to FIG. 1, receipt destination 65 may include a variety of devices and entities, or a combination thereof. For example, receipt destination 65 may include customer PDA 24. That is, electronic receipt 26 is transmitted (by transmitter 52) back to customer 12 at POS terminal 14. Receipt destination 65 may include an expense accounting system 80 such as a customer employer expense reporting system, a customer personal expense tracking system (e.g., Quicken®, Microsoft Money®, TurboTax®) and/or a customer accountant expense tracking system. Electronic receipt 26 provides immediate information for cash flow and budget purposes to expense accounting system 80.

Each of these systems may be similar to conventional systems but include mechanisms to take advantage of electronic receipt 26. For example, expense account system 80 may include any now known or later developed mechanism for receiving electronic receipt 26 and automatically applying its content to appropriate application/field(s) of receipt destination 65, e.g., inputs of customer PDA 24, a customer employer expense reporting system such as Quickbooks®, or a customer personal expense tracking system such as Quicken®, Microsoft Money®, TurboTax®, or other application. In another example, expense account system 80 may include an expense categorizer 82 capable of organizing each item on electronic receipt 26 into an expense category, e.g., clothing, food, entertainment, etc. In another example, expense account system 80 may include a tax data collector 84 for gathering any data in electronic receipt 26 that may be significant for tax purposes, e.g., sales tax, a deductible expense, a deductible donation, medical expenses, large gifts, etc. Although particular modules are not shown, receipt destination 65 may also provide, via a customer's personal expense tracking system, tracking of personal expenses, tax related expenses and deductions, and general money management. For example, in addition to the above categorizing of expenses, receipt destination 65 may also include mechanisms for setting targets (i.e., budget) for expense category spending and an ability to compare incurred expenses to targets and flag excesses. Joint account holders can utilize receipt destination 65 (i.e., expense tracking systems: personal, through an account or other service provider system) to maintain accurate, up-to-date balances for joint account(s). In this fashion, receipt destination 65 may be used to coordinate spending by a number of individuals, and prevent debt problems. Accordingly, expense tracking may no longer be dependent upon an individual remembering to enter check amounts or credit card purchases to have an instantaneous view of a balance.

Receipt destination 65 may also include a tax authority 86 such as the US Internal Revenue Service (IRS), a state tax department, foreign equivalent of preceding or a combination thereof. Any of the above-described information could be forwarded directly to an account (e.g., a customer employer's client account for billing—not shown), and also tax authority 86, as appropriate. Receipt destination 65 may also include appropriate receipt storage 88 for long term archiving.

With regard to receipt destination database 68, content database 70 and receipt storage 88, it should be recognized that these memories may comprise any now known or later developed data storage system and/or transmission media, including magnetic media, optical media, random access memory (RAM), read only memory (ROM), a data object, etc., and may reside at a single physical location comprising one or more types of data storage, or be distributed across a plurality of physical systems.

IV. Operation

Figure 2:
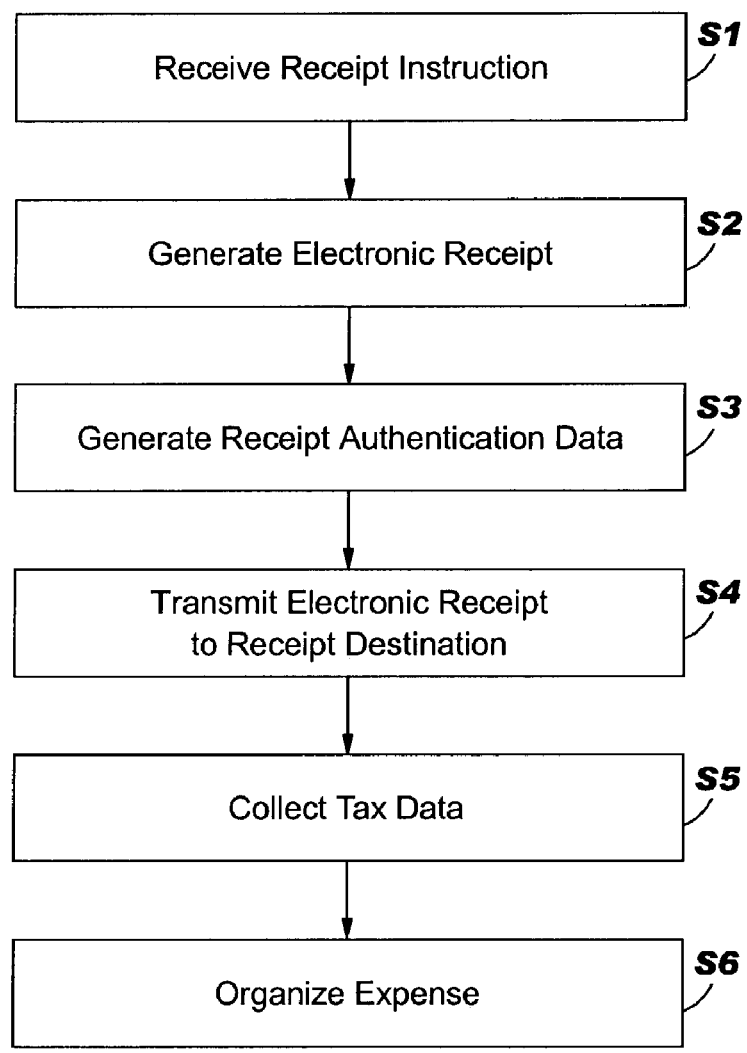
FIG. 2 shows a flow diagram of operation of the invention.

Referring to FIG. 2, operation of the above-described invention will now be described. In step S1, a receipt instruction 60 is received by POS terminal 14. Receipt instruction 60 including a receipt destination instruction (RDI) 64 and, perhaps, a content instruction 66. Step S1 may include retrieving receipt destination 65 from a receipt destination database 68 based on RDI 64. In step S2, an electronic receipt 26 is generated by generator 48 of POS terminal 14. Step S3 represents an optional step of generating receipt authentication data 72 at POS terminal 14 using authentication data generator 50, and transmitting receipt authentication data 72 using transmitter 52 to receipt destination 65. In step S4, electronic receipt 26 is transmitted to receipt destination 65. This step may also include automatically applying the contents of electronic receipt 26 to receipt destination 65, e.g., an expense accounting system 80 such as a customer personal expense tracking system. Steps S5 and S6 represent optional steps. In step S5, tax data is collected from electronic receipt 26 by tax data collector 84 of receipt destination 65. In step S6, an expense categorizer 82 of receipt destination 65 organizes an item on electronic receipt 26 into an expense category.

V. Conclusion

It should be recognized that the components of the above-described invention have been illustrated and described as being in particular locations, that they may be located at different points within the environment and accessed via high-speed communications. Accordingly, the location of components should not be considered limiting.

In the previous discussion, it will be understood that the method steps discussed are performed by a processor, such as a CPU of POS terminal 14, executing instructions of program product stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method performed on a computerized device for providing a receipt to a customer and a merchant at a point-of-sale, the method comprising:

on a processor, performing the following:

receiving a receipt instruction including a receipt destination instruction and a receipt content instruction, wherein the receipt destination instruction identifies a receipt destination relative to each of the customer and the merchant;

generating an electronic receipt, wherein the electronic receipt includes at least one of an image of a payment type used at the point of sale, irrespective of the payment type, wherein the payment type comprises at least one of paper currency, a credit card face, a smart card, a gift certificate, store credit, and a refund/exchange, and in a case where the payment type used at the point of sale is paper currency, a serial number of the paper currency and an image, wherein the image is a copy of a payment type used at the point-of-sale, the payment type comprising at least one of paper currency, a credit card face, a smart card, a gift certificate, store credit, and a refund/exchange;

generating receipt authentication data at the point-of-sale, the receipt authentication data comprising any data that can be used to confirm that the electronic receipt has not been altered;

generating a conventional paper receipt in addition to the electronic receipt; and transmitting the electronic receipt to the receipt destinations; and separately transmitting the receipt authentication data to the receipt destinations, wherein the receipt authentication data is stored at a merchant system.

2. The method of claim 1, wherein the receipt authentication data includes at least one of: receipt contents, date, time and merchant identification.

3. The method of claim 1, wherein the receipt destination includes at least one of: a personal digital assistant, a customer employer expense reporting system, a tax authority, a customer personal expense tracking system, a customer accountant expense tracking system and a tax authority.

4. The method of claim 1, wherein the transmitting further includes applying content of the electronic receipt to the receipt destination.

5. The method of claim 1, wherein the processor further comprising performs collecting tax data from the electronic receipt.

6. The method of claim 5, wherein the tax data includes at least one of: a sales tax paid and a deductible expense.

7. The method of claim 1, wherein the processor further comprising performs organizing an item on the electronic receipt into an expense category.

8. The method of claim 1, wherein the receiving includes retrieving a receipt destination from a receipt destination database based on a receipt destination instruction.

9. The method of claim 1, wherein the electronic receipt includes a primary key in the form of a unique transaction identifier.

10. The method of claim 1, wherein the electronic receipt includes at least one of the following fields: purchase date; time; merchant identification; issuing agent; address; merchant phone number; merchant universal resource locator; merchant facsimile number; point-of-sale identifier; buyer identification; additional merchant identification; payment type; transaction type; credit card type; purchase total; total tax; total tip; number of items; item description; item date; item type; and image of currency or check payment.

11. The method of claim 1, wherein the electronic receipt further includes information collected at a time of applying for a store card, wherein a customer presents the store card at the point-of-sale.

* * * * *